United States Patent [19]

Druschke et al.

[11] 4,289,685
[45] Sep. 15, 1981

[54] PROCESS FOR THE PREPARATION OF FLAME-RESISTANT POLYCARBONATES

[75] Inventors: Frank Druschke, Stuttgart; Dieter Margotte, Krefeld; Erhard Tresper, Krefeld; Ludwig Bottenbruch, Krefeld; Wolfgang Cohnen, Leverkusen; Uwe Hucks, Alpen, all of Fed. Rep. of Germany

[73] Assignee: Bayer Aktiengesellschaft, Leverkusen, Fed. Rep. of Germany

[21] Appl. No.: 174,298

[22] Filed: Aug. 4, 1980

[30] Foreign Application Priority Data

Aug. 17, 1979 [DE] Fed. Rep. of Germany ....... 2933344

[51] Int. Cl.$^3$ .................................................. C08K 5/42
[52] U.S. Cl. ........................... 260/45.7 S; 260/45.7 R; 260/45.75 N; 260/45.85 R; 528/196
[58] Field of Search .................. 260/45.7 SF; 528/196, 528/45.7 R

[56] References Cited

U.S. PATENT DOCUMENTS

| | | | |
|---|---|---|---|
| 3,525,712 | 8/1970 | Kramer | 528/196 |
| 3,775,367 | 11/1973 | Nouvertne | 260/45.7 SF |
| 3,787,359 | 1/1974 | Horn et al. | 528/196 |
| 3,836,490 | 9/1974 | Bockmann et al. | 528/196 |
| 3,933,734 | 1/1976 | Mark et al. | 528/196 |
| 3,954,713 | 5/1976 | Schnoring et al. | 528/196 |
| 4,098,754 | 7/1978 | Neuray et al. | 260/37 PC |
| 4,110,299 | 8/1978 | Mark | 260/45.7 SF |
| 4,113,695 | 9/1978 | Mark | 260/45.7 SF |
| 4,212,966 | 7/1980 | McClain | 528/486 |

FOREIGN PATENT DOCUMENTS 1370744 10/1974 United Kingdom .

*Primary Examiner*—Howard E. Schain
*Assistant Examiner*—R. A. White
*Attorney, Agent, or Firm*—Gene Harsh; Lawrence S. Pope; Aron Preis

[57] ABSTRACT

The invention relates to a process for rendering flame-resistant the thermoplastic aromatic polycarbonates prepared by a solution process, characterized by dispersing an aqueous solution of salt-like flameproofing agent in a washed and neutral polycarbonate/organic solvent system.

4 Claims, No Drawings

PROCESS FOR THE PREPARATION OF FLAME-RESISTANT POLYCARBONATES

SUMMARY OF THE INVENTION

The present invention relates to a process for the preparation of flame-resistant polycarbonates by adding salt-like flameproofing agents, characterized in that appropriate amounts of aqueous solutions of the flameproofing agents are dispersed in washed and neutral solutions of the polycarbonates in organic solvents such that the average particle diameter of the aqueous phase in the organic phase is less than 2 μm, and the polycarbonates are then isolated in the customary manner by evaporating off the solvent and the water.

Salt-like flameproofing agents are to be understood, for example as the known alkali metal salts, alkaline earth metal salts and transition metal salts of organic and inorganic acids. These agents can be incorporated in amounts of 0.001 to 5% by weight, preferably in amounts of 0.003 to 2% by weight and in particular in amounts of 0.005 to 0.5% by weight, in each case relative to the total weight of polycarbonate and salt-like flameproofing agent.

BACKGROUND OF THE INVENTION

It is known that the flame resistance of aromatic polycarbonates can be improved by adding salts of organic or inorganic acids, such as, the alkali metal salts. Such flame-resistant polycarbonates are described, for example, in German Offenlegungsschrift 1,930,257 (LeA 12,278), German Offenlegungsschrift 2,149,311 (LeA 13,999) and German Offenlegungsschrift 2,744,018.

Such salts have hitherto been incorporated either directly into the melt of the polycarbonates or by combining them with the polycarbonate solution, a solution of the salts in organic solvents being preferred in the latter case (see German Offenlegungsschrift No. 2,460,052 (LeA 19,004)). However, the disadvantage of the procedure is that most of the flameproofing agents for polycarbonates are substantially insoluble in the organic phase suitable for the preparation of the polycarbonates.

It is known, see U.S. Pat. No. 4,113,695, that in order to preserve the optical properties of polycarbonates upon rendering them flame resistant, it is preferable to use an aqueous solution, rather than a powdered form, of the flameproofing agents. The solution is thus applied to the surface of the resin followed by drying and by extrusion. Compared with the conventional processes, in which solid flameproofing agents are incorporated into the polycarbonates by mixing, the above process is deficient in terms of distribution and hence efficiency of the agents used.

It was thus unexpected that aqueous solutions of flameproofing agents could be distributed in the polycarbonate via an organic phase to such an extent that their activity becomes superior to that of flameproofing agents metered-in conventionally as solids.

DETAILED DESCRIPTION OF THE INVENTION

It is advantageous to use dispersing units, high-pressure homogenizers and the devices customarily used for the preparation of emulsions, for example Supraton units, in order to achieve uniform distribution of the aqueous solutions of the flameproofing salts in the organic phase. The suitability of these devices depends on the nature of the organic solvents used, on the concentration of the polycarbonate in the solvent or solvent mixture and on the nature of the mixture to be prepared from the polycarbonate solution and the aqueous salt solution. For an optimum effect, the average particle diameter of the aqueous phase in the organic phase should be less than 2 μm.

The amounts of flameproofing salts to be added as an aqueous solution in the process according to the invention depend on the content desired in the polycarbonate to be rendered flame-resistant; the concentration of the salts depends on their solubility in water and is between 0.05% by weight and 50% by weight, preferably between 0.05 and 30% by weight, relative to the weight of aqueous salt solution. The concentration of polycarbonate in the organic phase is usually between about 10% by weight and 20% by weight, relative to polycarbonate and organic solvent. The amount of aqueous salt solution relative to organic phase is between 0.01 and 3 parts by weight per 100 parts by weight of the organic phase.

Thorough mixing of the phases to form a homogeneous mixture can be further promoted by using customary amounts of suitable emulsifiers. Examples of suitable emulsifiers are the alkali metal salts of higher fatty acids, of alkylsulphonic acid, of alkylsulphuric acids, of alkylarylsulphonic acids and of sulphosuccinic acid esters.

The thorough mixing to form a homogeneous mixture can be carried out at temperatures between about 20° C. and 80° C.

The salt-containing polycarbonate is then isolated from the resulting emulsions by known processes, for example, by evaporation processes.

In a particularly advantageous embodiment of the dispersion procedure, the aqueous salt solution is combined with the polycarbonate solution, which has been washed until free from electrolytes, immediately before evaporation of the solvent and of the water. Evaporation processes such as described in German Offenlegungsschrift No. 1,921,045, for example can be utilized.

The salt-containing polycarbonates are then isolated via a devolatilization extruder and are taken off as a strand and granulated.

The salt concentration in the polycarbonate largely corresponds to the amount of salt metered-in with the aqueous solution. However, in the case of some salts, it is advisable to increase the amount of the metered-in salt by about 5% by weight relative to the particular amount of salt required in the polycarbonate.

Compared with the above-mentioned known processes for incorporating flameproofing agents, the advantage of the process according to the invention is that considerably smaller amounts of these predominantly water-soluble flameproofing salts are necessary to provide the polycarbonates with particular flame-resistant properties.

Polycarbonates which can be used in the preparation according to the invention, of flame-resistant polycarbonate are for example, those homopolycarbonates and/or copolycarbonates based on one or more of the following diphenols: 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane and 4,4'-dihydroxydiphenyl ether.

These and other suitable diphenols are described, for example, in U.S. Pat. No. 3,038,365, in German Offenlegungsschriften Nos. 1,570,703 and 2,036,050 and in the monograph "H. Schnell, Chemistry and Physics of Polycarbonates, Interscience Publishers, New York, 1964".

Preferred diphenols are 2,2-bis-(4-hydroxyphenyl)-propane, 1,1-bis-(4-hydroxyphenyl)-cyclohexane and α,α'-bis-(4-hydroxyphenyl)-p-diisopropylbenzene.

Preferred aromatic polycarbonates are those which are based on one or more of the diphenols mentioned as preferred. Particularly preferred polycarbonates are copolycarbonates based on 2,2-bis-(4-hydroxyphenyl)-propane and one of the other diphenols mentioned as preferred. Polycarbonates based on 2,2-(4-hydroxyphenyl)-propane alone are also particularly preferred.

The aromatic polycarbonates can be prepared by the known solution processes, such as are described in the above-mentioned literature, for example, from bisphenols and phosgene by the so-called pyridine process, carried out in a homogeneous phase system, or the two-phase boundary process.

The aromatic polycarbonates can be branched by incorporating small amounts, preferably amounts between 0.05 and 2.0 mol % (relative to diphenols employed) of compounds which are trifunctional or more than trifunctional, in particular those with three or more phenolic hydroxyl groups.

Polycarbonates of this type are described, for example, in German Offenlegungsschriften Nos., 1,570,533; 1,595,762; 2,116,974 and 2,113,347, in British Patent Specification No. 1,079,821, in U.S. Pat. No. 3,544,514 and in German Offenlegungsschrift No. 2,500,092.

The thermoplastic aromatic polycarbonates should as a rule have mean weight-average molecular weight ($M_w$) of 10,000 to over 200,000, preferably of 20,000 to 50,000, these molecular weights being determined by measuring the relative viscosity in $CH_2Cl_2$ at 25° C. and at a concentration of 0.5% by weight, after first calibrating the viscosity curve by measuring the molecular weights of the polycarbonate by the light scattering method.

Solutions, which have been washed until neutral and freed from electrolytes, of the thermoplastic, aromatic polycarbonates to be rendered flame-resistant in the process according to the invention can be prepared in a known manner in accordance with the known method for the preparation of polycarbonates by the solution process. Examples of particularly suitable organic solvents are chlorobenzene, methylene chloride and mixtures thereof.

Examples of polycarbonate solutions which can be used according to the invention are described in German Auslegeschrift No. 1,300,266 and German Offenlegungsschrift No. 2,410,716.

The salt-like flameproofing agents used for the process according to the invention are, for example, salts of inorganic proton acids. Inorganic proton acids in the context of the invention are Brönsted acids which can form alkali metal salts or alkaline earth metal salts (for the definition of the term "Brönsted acids", compare Fieser & Fieser "Organic Chemistry", 1965, page 595, Interscience Publishers, N.Y., U.S.A.), such as, for example, sulphuric acid, hydrofluoric acid, hydrochloric acid, hydrobromic acid, meta-, ortho- or pyro-phosphoric acid and proton acids of complex metalfluorine compounds. Examples of such alkali metal salts or alkaline earth metal salts of complex metalfluorine compounds which can be used are: hexafluoroaluminates, hexafluorotitanates, hexafluoroantimonates, hexafluorosilicates, hexafluorotungstates, hexafluorozirconates, hexafluorophosphates and tetrafluoroborates.

Boranates, such as sodium boranates and potassium boranates, are also suitable.

Examples of inorganic halides which may be mentioned are sodium chloride, lithium chloride, potassium iodide, sodium bromide, lithium bromide, calcium chloride, potassium bromide, magnesium chloride and potassium chloride.

Salts of organic acids are also examples of salt-like flameproofing agents which can be used according to the invention. Organic acids in the context of the invention are those organic Brönsted acids which have at least one carbon atom and can form alkali metal salts or alkaline earth metal salts.

Such optionally substituted organic acids can be OH acid or NH acid compounds, such as, for example, carboxylic acids, sulphonic acids, phosphonic acids, thiophosphonic acids, NH-acids sulphonamides or sulphonimides, or monofunctional or polyfuncational phenols or alcohols.

Sodium or potassium perfluorobutanesulphonate, sodium or potassium perfluoromethanesulphonate, sodium or potassium 2,5-dichlorobenzenesulphonate, sodium or potassium 2,4,5-trichlorobenzenesulphonate, sodium or potassium(4-chlorophenyl)-phosphonate, sodium or potassium methylphosphonate, sodium or potassium(2-phenylethylene)-phosphonate, sodium or potassium pentachlorobenzoate, sodium or potassium 2,4,6-trichlorobenzoate, sodium or potassium 2,4-dichlorobenzoate, sodium or potassium 2-ethyl-caproate, lithium phenylphosphonate, lithium 4-dodecylphenylsulphonate and lithium 4-nonyl-2,5-dichlorophenylsulphonate may be mentioned in particular.

Further suitable alkali metal salts and/or alkaline earth metal salts in the context of the invention are described, for example, in German Offenlegungsschriften Nos. 2,460,925; 2,460,944; 2,460,945; 2,460,946, 2,461,145; 2,535,261; 2,535,262; 2,535,263; 2,631,756; 2,643,256; 2,644,114; 2,645,415; 2,646,120; 2,647,271; 2,648,131; 2,653,327; 2,648,128; 2,744,015; 2,744,016; 2,744,017; 2,744,018; 2,745,592 and 2,746,906.

The transition metal salts, such as, for example, the nickel salts, of the above-mentioned inorganic and organic acids are also examples of suitable salt-like flameproofing agents.

The salt-like flameproofing agents can be used by themselves or in combination with other salts, in particular those which have a synergistic effect on the low inflammability of the polycarbonate compositions.

Salt-like flameproofing agents which can preferably be used are the alkali metal salts and alkaline earth metal salts, in particular the alkali metal salts.

The flame-resistant molding compositions prepared by the process according to the invention can be processed to films and moldings by the customary methods for processing thermoplastics, such as by extrusion or injection-molding.

The flame-resistant polycarbonate molding compositions obtained by the process according to the invention can also contain other additives, such as antistatic agents, pigments, mold release agents, stabilizers and fillers.

The molding compositions according to the invention can be used in all cases where flame-resistant polycarbonates have hitherto been used successfully, for example in the electrical sector and in the mechanical engineering sector.

To test the flame-resistant properties, 5 test rods, each with the dimensions 127 mm×12.7 mm×1.6 (or 3.2) mm were produced by injection-molding and were subjected to the burning test in accordance with the method of UL-94. The results are summarized in Table II.

The Examples which follow are intended to illustrate the invention in more detail.

Procedure

In each case 1 kg of the aqueous salt solution having the salt concentration indicated in Table I is emulsified continuously, using a high-speed centrifugal pump, in 71.5 kg of a continuously prepared 14% strength by weight polycarbonate solution which has been washed until free from electrolytes (see, for example, German Auslegschrift No. 1,300,266 or German Offenlegungsschrift No. 2,410,716). The mixture is fed immediately into a thin film evaporator and some of the solvent or solvent mixture and some of the water are distilled off. The concentrated solution is freed from residual solvent in vacuo in a devolatilization extruder. The polycarbonate melt is taken off as a strand and granulated and the granules are processed to test rods for the burning test in accordance with the method of UL-94.

test piece, which are calculated from the sum of the after-burn times of a set of test pieces. The figures given are the sums of the after-burn times of 5 test pieces 1.6 mm thick.

(xx) The salt was admixed to the polycarbonate by compounding with a twin-screw extruder.

(xxx) The salt was applied to the polycarbonate granules via an aqueous solution and the granules were then homogenized using a twin-screw extruder, in accordance with the method of U.S. Pat. No. 4,113,695.

What is claimed is:

1. In the process of rendering flame-resistant the thermoplastic aromatic polycarbonates prepared by a solution process, the improvement comprising steps
    (i) washing the polycarbonate/organic solvent system until neutral and free of electrolytes and
    (ii) adding to the neutral and electrolyte free system an effective amount of an aqueous solution of a salt-like flameproofing agent and
    (iii) dispersing said aqueous solution, in the form of particulates of less than 2 $\mu$m in diameter, in said system and
    (iv) isolating the polycarbonate/salt-like flameproofing agent composition by evaporating the water and the organic solvent.

2. The process of claim 1 wherein said salt-like flameproofing agent is selected from the group consisting of alkali metal salts and alkaline earth metal salts.

3. The process of claim 1 wherein said salt-like flameproofing agents comprise between 0.001 and 5%, relative to the weight of said composition.

4. The process of claim 1 wherein emulsifying agents are added in said step (ii).

TABLE I

Process Conditions

| EXAMPLE | Polycarbonate solvent used | Relative solution viscosity | Salt concentration of the aqueous solution (% by weight) |
| --- | --- | --- | --- |
| 1 | Methylene chloride/chlorobenzene (60/40) | 1.293 | 0 |
| 2 | Methylene chloride/chlorobenzene (60/40) | 1.295 | 0.08 |
| 3 | Methylene chloride/chlorobenzene (50/50) | 1.289 | 0.25 |
| 3a (Comparison experiment) | Methylene chloride/chlorobenzene (50/50) | 1.295 | (xx) |
| 3b (Comparison experiment) | Methylene chloride/chlorobenzene (50/50) | 1.295 | (xxx) |
| 4 | Methylene chloride/chlorobenzene (60/40) | 1.296 | 0.09 |
| 5 | Chlorobenzene | 1.329 | 0.14 |
| 6 | Methylene chloride/chlorobenzene (60/40) | 1.296 | 0.18 |

(xx) and (xxx) See the footnote under Table II.

TABLE II

Evaluation of the Flammability

| Example | Salt Incorporated | Amount (% by weight relative to the weight of polycarbonate) | Evaluation according to UL-94 3.2 mm | 1.6 mm | Total after-burn time(s)[x] |
| --- | --- | --- | --- | --- | --- |
| 1 | — | — | V2 | V2 | 104 |
| 2 | Potassium perfluorobutanesulphonate | 0.008 | V1 | V2 | 36 |
| 3 | Potassium perfluorobutanesulphonate | 0.025 | V0 | V2 | 23 |
| 3a | Potassium perfluorobutanesulphonate (comparison experiment) | 0.025 | V2 | V2 | 83 |
| 3b | Potassium perfluorobutanesulphonate | 0.025 | V2 | V2 | 79 |
| 4 | Potassium bromide | 0.009 | V1 | V2 | 63 |
| 5 | Potassium 2-ethyl-n-caproate | 0.014 | V1 | V2 | 38 |
| 6 | Potassium perfluorobutanesulphonate and potassium bromide | 0.013 0.005 | V0 | V2 | 25 |

TABLE II: Evaluation of the flammability (continuation)

(x) The evaluation criteria for the grading according to UL-94 include the average of the after-burn times per